United States Patent
Yu et al.

(10) Patent No.: US 10,341,602 B2
(45) Date of Patent: Jul. 2, 2019

(54) TV POWER SUPPLY

(71) Applicant: Shenzhen China Star Optoelectronics Technology Co., Ltd., Shenzhen (CN)

(72) Inventors: Xuekun Yu, Shenzhen (CN); Wendong Li, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 50 days.

(21) Appl. No.: 15/547,803

(22) PCT Filed: Jun. 14, 2017

(86) PCT No.: PCT/CN2017/088167
§ 371 (c)(1),
(2) Date: Jul. 31, 2017

(87) PCT Pub. No.: WO2018/192077
PCT Pub. Date: Oct. 25, 2018

(65) Prior Publication Data
US 2018/0309952 A1 Oct. 25, 2018

(30) Foreign Application Priority Data
Apr. 20, 2017 (CN) .......................... 2017 1 0260878

(51) Int. Cl.
*H04N 5/63* (2006.01)
*H04N 5/44* (2011.01)
(Continued)

(52) U.S. Cl.
CPC .......... *H04N 5/63* (2013.01); *G02F 1/133602* (2013.01); *G09G 3/36* (2013.01);
(Continued)

(58) Field of Classification Search
CPC .......... H04N 5/63; H04N 5/44; H04N 5/4401; H04N 5/4411; G02F 1/133602;
(Continued)

(56) References Cited

U.S. PATENT DOCUMENTS 4,788,618 A 11/1988 Kimura
2016/0315544 A1* 10/2016 Joo .................... H02M 3/33523
(Continued)

FOREIGN PATENT DOCUMENTS

CN 101771839 A 7/2010
CN 202475621 U 10/2012
(Continued)

*Primary Examiner* — Sherrie Hsia
(74) *Attorney, Agent, or Firm* — Leong C. Lei

(57) ABSTRACT

The present invention provides a TV power supply, which comprises a main power supply and a voltage conversion circuit electrically connected to the main power supply. The main power supply comprises a first output terminal for outputting a backlight driving voltage and a second output terminal for outputting a motherboard driving voltage. The voltage conversion circuit is configured to convert the backlight driving voltage or the motherboard driving voltage to a standby voltage. The voltage conversion circuit comprises an input terminal electrically connected to the first output terminal or the second output terminal and a third output terminal for outputting the standby voltage. The TV power supply can convert the backlight driving voltage or the motherboard driving voltage into the standby voltage through the voltage conversion circuit, and simultaneously generates the motherboard driving voltage, the backlight driving voltage and the standby voltage through a power supply, effectively reducing the number of the flyback power supply and reducing the TV power supply costs, and improving the cost competitiveness of the TV.

17 Claims, 2 Drawing Sheets

(51) Int. Cl.
  *G09G 3/36* (2006.01)
  *H02M 3/335* (2006.01)
  *G02F 1/1335* (2006.01)
  *H02M 7/217* (2006.01)
  *H02M 1/00* (2006.01)

(52) U.S. Cl.
  CPC ...... *G09G 3/3696* (2013.01); *H02M 3/33523* (2013.01); *H02M 3/33561* (2013.01); *H02M 7/217* (2013.01); *H04N 5/44* (2013.01); *G02F 2001/133612* (2013.01); *G09G 2330/021* (2013.01); *H02M 2001/0032* (2013.01); *H02M 2001/0045* (2013.01)

(58) Field of Classification Search
  CPC .......... G02F 2001/133612; G09G 3/36; G02G 2330/021; H02M 3/33523; H02M 7/217
  USPC .................................................. 348/730, 725
  See application file for complete search history.

(56) References Cited

U.S. PATENT DOCUMENTS

2017/0310923 A1* 10/2017 Yang .................. H04N 5/63
2018/0035157 A1*  2/2018 Chen .................. G09G 3/36

FOREIGN PATENT DOCUMENTS

| CN | 103701337 A | 4/2014 |
| CN | 103997237 A | 8/2014 |
| CN | 106572565 A | 4/2017 |

* cited by examiner

TV POWER SUPPLY

BACKGROUND OF THE INVENTION

Field of Invention

The present invention relates to the field of liquid crystal display, and more particularly to a TV power supply.

Description of Prior Art

With the development of display technology, because of the advantages of high quality, power saving, thin body and wide applications, the liquid crystal displays (Liquid Crystal Display, LCD) and other flat panel display devices has become a mainstream in the display devices and been widely used in various consumer electronic devices, such as mobile phones, personal digital assistants, digital cameras, laptops, and desktop computers.

Most of the liquid crystal display devices on the market are backlight type liquid crystal displays, which include liquid crystal display panels and backlight modules. The working principle of the liquid crystal display panel is to place liquid crystal molecules in two parallel glass substrate, there are many small vertical and horizontal wires between the two glass substrates, which are used to control the liquid crystal molecules to change the direction themselves according to whether there is electricity in the wires or not, and the light of the backlight module light is refracted to produce an image.

LCD TV is one of the most important applications of the liquid crystal display devices, the LCD TV power supply is an indispensable part of various LCD TVs, the LCD TV power supply is usually used flyback switching power supply, with advantages with a relatively simple structure, low cost, less elements and so on. The general flyback switching power supply is usually composed of a pulse width modulation IC (PWM IC), a transformer, a rectifying filter module, a voltage feedback module and a switching device. The working process is: after accessing the external high AC Voltage, the PWM IC sends a pulse signal to control the on/off of the switching device. When the switching device is turned on, the external AC voltage is rectified and is inputted into the primary coil of the transformer to store the energy. When the switching device is turned off, the energy stored in the primary coil of the transformer is released by a secondary coil, after the function of the rectifying filter module, a DC voltage is stably outputted to a loading, and the voltage feedback module is inputted with the output voltage, to generate a feedback signal for transmitting to a feedback pin of the PWM IC, when the output voltage increases or decreases, the PWM IC adjusts the pulse signal to control the time ratio of the switch device, so that the output voltage value is adjusted to stabilize the output voltage.

Presently, during working, the LCD TV usually needs to provide a backlight driving voltage (usually 24V) and a motherboard driving voltage (usually 12V); in standby, to provide a standby voltage (usually 5V), which the backlight drive voltage and motherboard The drive voltage is generated by a flyback power supply, while the standby voltage is generated by another flyback power supply alone, at a higher cost, and has a complicated layout.

SUMMARY OF THE INVENTION

The object of the present invention is to provide an improved TV power supply.

In order to achieve the objective, the present invention provides a TV power supply, which comprises a main power supply and a voltage conversion circuit electrically connected to the main power supply.

The main power supply comprises a first output terminal for outputting a backlight driving voltage and a second output terminal for outputting a motherboard driving voltage.

The voltage conversion circuit is configured to convert the backlight driving voltage or a motherboard driving voltage to a standby voltage. The voltage conversion circuit comprises an input terminal electrically connected to the first output terminal or the second output terminal and a third output terminal for outputting the standby voltage.

The voltage conversion circuit comprises a first resistor, a second resistor, a third resistor, a first transistor, a second transistor, and a zener diode.

One terminal of the first resistor is electrically connected to a first node and the other terminal of the first resistor is electrically connected to an emitting electrode of the second transistor.

One terminal of the second resistor is electrically connected to the first node and the other terminal of the second resistor is electrically connected to one terminal of the third resistor.

The other terminal of the third resistor is electrically connected to a base electrode of the first transistor.

A collect electrode of the first transistor is electrically connected to the terminal of the third resistor, the emit electrode of the first transistor is electrically connected to a second node.

The base electrode of the second transistor is electrically connected to the terminal of the third resistor and the collect electrode of the second transistor is electrically connected to the second node.

A cathode of the zener diode is electrically connected to the base electrode of the first transistor and the anode of the zener diode is grounded.

The first node is the input terminal of the voltage conversion circuit, the second node is the third output terminal of the voltage conversion circuit.

The backlight driving voltage is 24V, the motherboard driving voltage is 12V, and the standby voltage is 5V.

The stabilize voltage of the zener diode is 5.7 V and the conduction voltage drop of the emitter junction of the first transistor is 0.7 V.

The first transistor is an NPN type transistor, and the second transistor is a PNP type transistor.

The main power supply comprises a rectifying filter module, an energy-storage transformer module electrically connected with the rectifying filter module, a switch module electrically connected to the energy-storage transformer module, a pulse width modulation chip electrically connected to the switch module, an output filter module electrically connected with the energy-storage transformer module, and a feedback module electrically connected with both the output filter module and the pulse width modulation chip.

The rectifying filter module is used for accessing an AC voltage and converting the AC voltage into a DC voltage, and filtering the DC voltage to the energy-storage transformer module.

The energy-storage transformer module is used for storing energy under the control of the switch module or outputting the received DC voltage to the output filter module after transforming voltage.

The switch module is used for controlling the energy-storage transformer module to store energy or transforming voltage.

The pulse width modulation chip is used for providing a pulse signal to the switch module, to control a switch of the switch module.

The output filter module is used for filtering the DC voltage transformed by the energy-storage transformer module, and outputting the backlight driving voltage and the motherboard driving voltage.

The feedback module is used for monitoring the output of the backlight driving voltage and the motherboard driving voltage, and generating a feedback signal to control the pulse width modulation chip for adjusting the pulse signal to ensure the stable output of the backlight driving voltage and motherboard driving voltage, when the backlight driving voltage and the motherboard driving voltage change.

The rectifying filter module comprises a rectifying bridge, a first electrolytic capacitor, and a first capacitor.

A first terminal of the rectifying bridge is electrically connected with an anode of the first electrolytic capacitor, the second terminal of the rectifying bridge is electrically connected with a neutral line of the AC voltage, the third terminal of the rectifying bridge is electrically connected with a live wire of the AC voltage, and the fourth terminal of the rectifying bridge is grounded.

The anode of the first electrolytic capacitor is electrically connected to one terminal of the first capacitor and the cathode of the first electrolytic capacitor is grounded.

One terminal of the first capacitor is electrically connected to the energy-storage transformer module and the other terminal of the first capacitor is grounded.

The energy-storage transformer module comprises a fourth resistor, a second capacitor, a first diode, and a transformer; the switch module comprises a MOS transistor and a fifth resistor.

One terminal of the fourth resistor is electrically connected to the terminal of the first capacitor and the other terminal of the fourth resistor is electrically connected to a cathode of the first diode.

One terminal of the second capacitor is electrically connected to the terminal of the fourth resistor and the other terminal of the second capacitor is electrically connected to the cathode of the first diode.

The transformer comprises a primary coil, a first secondary coil, and a second secondary coil, one terminal of the primary coil is electrically connected to the terminal of the second capacitor and the other terminal of the primary coil is electrically connected to an anode of the first diode, the first and the second secondary coils are electrically connected to the output filter module.

The anode of the first diode is electrically connected to a drain electrode of the MOS transistor.

A gate electrode and a source electrode of the MOS transistor are electrically connected to the pulse width modulation chip.

One terminal of the fifth resistor is electrically connected to the source electrode of the MOS transistor and the other terminal of the fifth resistor is grounded.

The output filter module comprises a second diode, a third diode, a fourth diode, a fifth diode, a second electrolytic capacitor, and a third electrolytic capacitor.

An anode of the second diode is electrically connected to one terminal of the first secondary coil and a cathode of the second diode outputs the backlight driving voltage.

An anode of the third diode is electrically connected to the anode of the second diode and a cathode of the third diode is electrically connected to the cathode of the second diode.

An anode of the fourth diode is electrically connected to one terminal of the second secondary coil and the cathode of the fourth diode is electrically connected to the other terminal of the first secondary coil and outputs the motherboard driving voltage at the same time.

An anode of the fifth diode is electrically connected to the anode of the fourth diode and a cathode of the fifth diode is electrically connected to the cathode of the fourth diode.

An anode of the second electrolytic capacitor is electrically connected to the cathode of the second diode and a cathode of the second electrolytic capacitor is grounded.

An anode of the third electrolytic capacitor is electrically connected to the other terminal of the first secondary coil and a cathode of the third electrolytic capacitor is electrically connected to the other terminal of the second secondary coil and is grounded at the same time.

The feedback module comprises a photo-coupler, a third capacitor, a sixth resistor, a seventh resistor, an eighth resistance, a ninth resistance, a tenth resistance, and a controllable precision regulator supply.

An anode of a light-emitting diode of the photo-coupler is electrically connected to one terminal of the seventh resistor, the cathode of the light-emitting diode of the photo-coupler is electrically connected to the other terminal of the seventh resistor, an emit electrode of a phototransistor of the photo-coupler is electrically connected to one terminal of the third capacitor, the collect electrode of the phototransistor of the photo-coupler is electrically connected to the other terminal of the third capacitor.

The terminal of the third capacitor is grounded and the other terminal of the third capacitor is electrically connected to the pulse width modulation chip.

One terminal of the sixth resistor is electrically connected to the cathode of the second diode and the other terminal of the sixth resistor is electrically connected to the terminal of the seventh resistor.

The other terminal of the seventh resistor is electrically connected to the cathode of the controllable precision regulator supply.

One terminal of the eighth resistor is electrically connected to the reference electrode of the controllable precision regulator supply and the other terminal of the eighth resistor is electrically connected to the anode of the controllable precision regulator supply and is grounded at the same time.

One terminal of the ninth resistor is electrically connected to the cathode of the fourth diode and the other terminal of the ninth resistor is electrically connected to the terminal of the eighth resistor.

One terminal of the tenth resistor is electrically connected to the cathode of the second diode and the other terminal of the tenth resistor is electrically connected to the terminal of the eighth resistor.

The present invention further provides a TV power supply, which comprises a main power supply and a voltage conversion circuit electrically connected to the main power supply.

The main power supply comprises a first output terminal for outputting a backlight driving voltage and a second output terminal for outputting a motherboard driving voltage.

The voltage conversion circuit is configured to convert the backlight driving voltage or a motherboard driving voltage to a standby voltage. The voltage conversion circuit comprises an input terminal electrically connected to the first output terminal or the second output terminal and a third output terminal for outputting the standby voltage.

The voltage conversion circuit comprises a first resistor, a second resistor, a third resistor, a first transistor, a second transistor, and a zener diode.

One terminal of the first resistor is electrically connected to a first node and the other terminal of the first resistor is electrically connected to an emitting electrode of the second transistor.

One terminal of the second resistor is electrically connected to the first node and the other terminal of the second resistor is electrically connected to one terminal of the third resistor.

The other terminal of the third resistor is electrically connected to the base electrode of the first transistor.

A collect electrode of the first transistor is electrically connected to the terminal of the third resistor, the emit electrode of the first transistor is electrically connected to a second node.

The base electrode of the second transistor is electrically connected to the terminal of the third resistor and the collect electrode of the second transistor is electrically connected to the second node.

A cathode of the zener diode is electrically connected to the base electrode of the first transistor and the anode of the zener diode is grounded.

The first node is the input terminal of the voltage conversion circuit, the second node is the third output terminal of the voltage conversion circuit.

The voltage difference between a stable voltage of the zener diode and the conduction voltage drop of the emitter junction of the first transistor is equal to the standby voltage.

The main power supply comprises a rectifying filter module, an energy-storage transformer module electrically connected with the rectifying filter module, a switch module electrically connected to the energy-storage transformer module, a pulse width modulation chip electrically connected to the switch module, an output filter module electrically connected with the energy-storage transformer module, and a feedback module electrically connected with both the output filter module and the pulse width modulation chip.

The rectifying filter module is used for accessing an AC voltage and converting the AC voltage into a DC voltage, and filtering the DC voltage to the energy-storage transformer module.

The energy-storage transformer module is used for storing energy under the control of the switch module or outputting the received DC voltage to the output filter module after transforming voltage.

The switch module is used for controlling the energy-storage transformer module to store energy or transforming voltage.

The pulse width modulation chip is used for providing a pulse signal to the switch module, to control a switch of the switch module.

The output filter module is used for filtering the DC voltage transformed by the energy-storage transformer module, and outputting the backlight driving voltage and the motherboard driving voltage.

The feedback module is used for monitoring the output of the backlight driving voltage and the motherboard driving voltage, and generating a feedback signal to control the pulse width modulation chip for adjusting the pulse signal to ensure the stable output of the backlight driving voltage and motherboard driving voltage, when the backlight driving voltage and the motherboard driving voltage change.

The beneficial effect of the present invention is: the present invention provides a TV power supply, which comprises a main power supply and a voltage conversion circuit electrically connected to the main power supply. The main power supply comprises a first output terminal for outputting a backlight driving voltage and a second output terminal for outputting a motherboard driving voltage. The voltage conversion circuit is configured to convert the backlight driving voltage or the motherboard driving voltage to a standby voltage. The voltage conversion circuit comprises an input terminal electrically connected to the first output terminal or the second output terminal and a third output terminal for outputting the standby voltage. The TV power supply can convert the backlight driving voltage or the motherboard driving voltage into the standby voltage through the voltage conversion circuit, and simultaneously generates the motherboard driving voltage, the backlight driving voltage and the standby voltage through a power supply, effectively reducing the number of the flyback power supply and reducing the TV power supply costs, and improving the cost competitiveness of the TV.

BRIEF DESCRIPTION OF THE DRAWINGS

For better understanding the technical proposals and other beneficial effects of the present invention, please refer the following detailed description of the present invention with the accompanying drawings.

In drawings.

DETAILED DESCRIPTION OF THE PREFERRED EMBODIMENTS

The technical proposals and the effects of the present invention will be described in further detail with reference to the below preferred embodiments of the present invention and their accompanying drawings.

Figure 1:
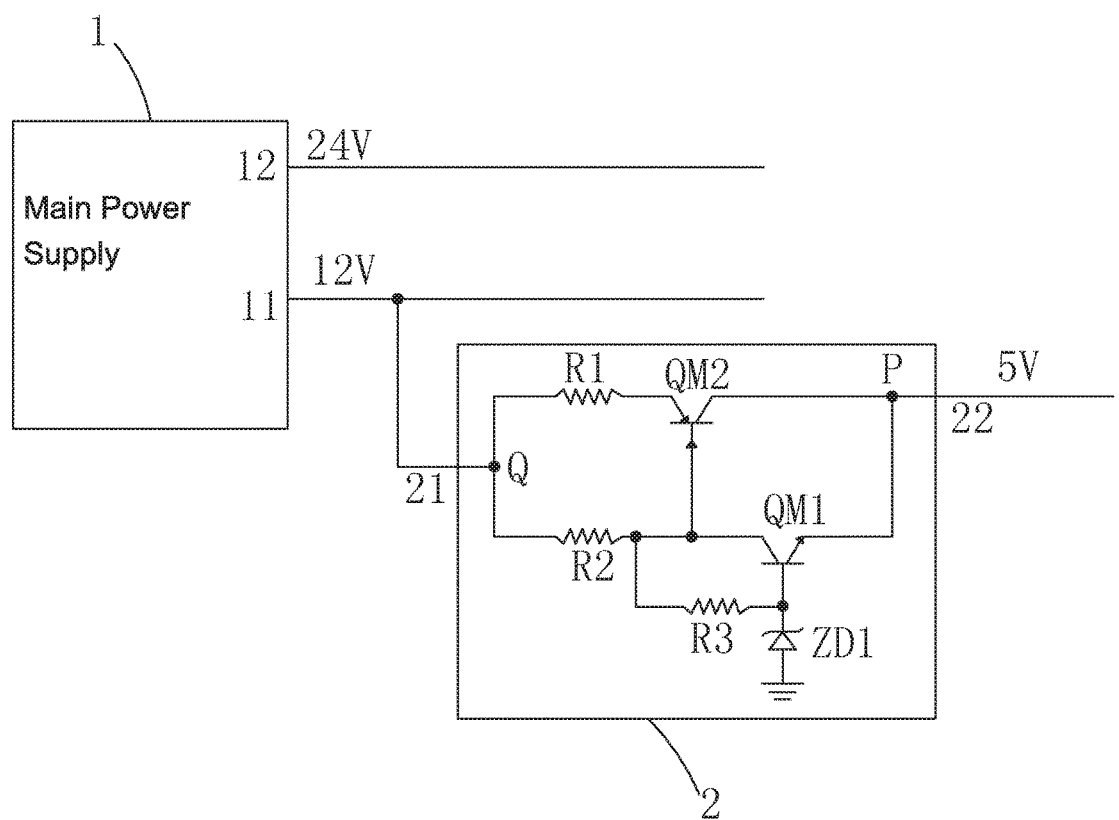
FIG. 1 is a circuit diagram of a TV power supply according to the present invention

Please refer to FIG. 1, the present invention provides a TV power supply, which comprises a main power supply 1 and a voltage conversion circuit 2 electrically connected to the main power supply 1.

The main power supply 1 comprises a first output terminal 11 for outputting a backlight driving voltage and a second output terminal 12 for outputting a motherboard driving voltage.

The voltage conversion circuit 2 is configured to convert the backlight driving voltage or a motherboard driving voltage to a standby voltage. The voltage conversion circuit 2 comprises an input terminal 21 electrically connected to the first output terminal 11 or the second output terminal 12 and a third output terminal 22 for outputting the standby voltage.

Specifically, the voltage conversion circuit 2 comprises a first resistor R1, a second resistor R2, a third resistor R3, a first transistor QM1, a second transistor QM2, and a zener diode ZD1.

One terminal of the first resistor R1 is electrically connected to a first node Q and the other terminal of the first resistor R1 is electrically connected to an emitting electrode of the second transistor QM2. One terminal of the second resistor R2 is electrically connected to the first node Q and the other terminal of the second resistor R2 is electrically connected to one terminal of the third resistor R3. The other terminal of the third resistor R3 is electrically connected to the base electrode of the first transistor QM1. A collect electrode of the first transistor QM1 is electrically connected to the terminal of the third resistor R3, the emit electrode of the first transistor QM1 is electrically connected to a second node P. The base electrode of the second transistor QM2 is electrically connected to the terminal of the third resistor R3, the collect electrode of the second transistor QM2 is electrically connected to the second node P. A cathode of the zener diode ZD1 is electrically connected to the base electrode of the first transistor QM1 and the anode of the zener diode ZD1 is grounded. The first node Q is the input terminal 21 of the voltage conversion circuit 2, the second node P is the third output terminal 22 of the voltage conversion circuit 2. The voltage difference between a stable voltage of the zener diode ZD1 and the conduction voltage drop of the emitter junction of the first transistor QM1 is equal to the standby voltage.

It needs be noted that the working process of the voltage conversion circuit 2 is: after the backlight driving voltage or the motherboard driving voltage is inputted to the voltage conversion circuit 2, the zener diode ZD1 fixes the base electrode of the first transistor QM1 is fixed at the stable voltage of the zener diode ZD1, and the emit electrode of the first transistor QM1 outputs the standby voltage, the standby voltage is equal to the voltage difference between a stable voltage of the zener diode ZD1 and the conduction voltage drop of the emitter junction of the first transistor QM1. At the same time, when the current flowing through the first transistor QM1 increases, resulting in a pressure drop across the second resistor R2 being greater than a conduction voltage drop of the emitter junction of the second transistor QM2, the second transistor QM2 is turned on for bypassing the first transistor QM1, to reduce the heat generated by the first transistor QM1, and to prevent the first transistor QM1 overheating.

Preferably, the backlight driving voltage is 24V, the motherboard driving voltage is 12V, and the standby voltage is 5V. At this time, the stabilize voltage of the zener diode ZD1 is 5.7 V, the conduction voltage drop of the emitter junction of the first transistor QM1 is 0.7 V, and the conduction voltage drop of the emitter junction of the second transistor QM2 is 0.7 V, also. The standby voltage with a corresponding voltage value can be generated by setting the stable voltage of the zener diode ZD1 and the conduction voltage drop of the emission junction of the first transistor QM1.

Specifically, the first transistor QM1 is an NPN type transistor, and the second transistor QM2 is a PNP type transistor.

Figure 2:
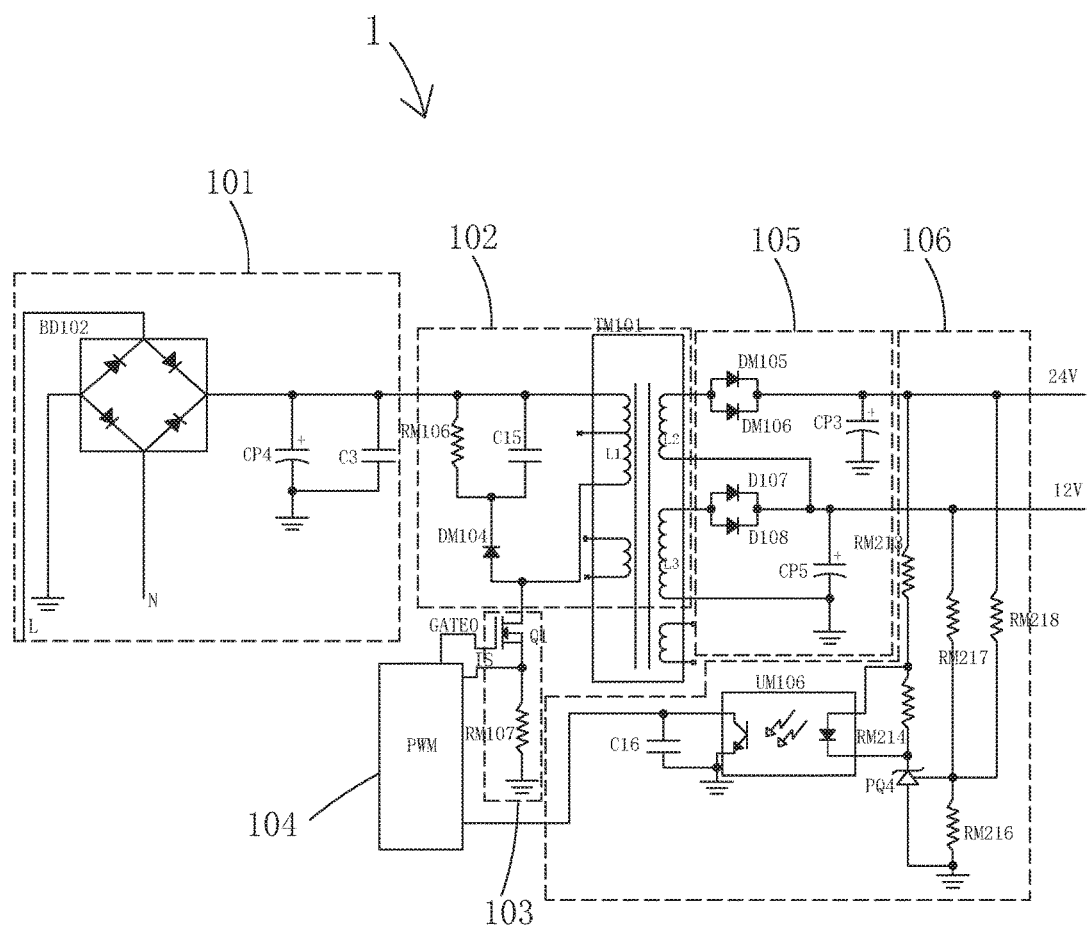
FIG. 2 is a circuit diagram of a main power supply of the TV power supply according to the present invention.

Specifically, as FIG. 2 shows, in one embodiment of the present invention, the main power supply 1 comprises a rectifying filter module 101, an energy-storage transformer module 102 electrically connected with the rectifying filter module 101, a switch module 103 electrically connected to the energy-storage transformer module 102, a pulse width modulation chip 104 electrically connected to the switch module 103, an output filter module 105 electrically connected with the energy-storage transformer module 102, and a feedback module 106 electrically connected with both the output filter module 105 and the pulse width modulation chip 104.

Furthermore, the rectifying filter module 101 accesses an external AC voltage (such as mains electricity, 220V) and converting the AC voltage into a DC voltage, and filters the DC voltage to the energy-storage transformer module 102. The energy-storage transformer module 102 stores energy under the control of the switch module 103 or outputs the received DC voltage to the output filter module 105 after transforming voltage. When the switch module 103 is turned on, the energy-storage transformer module 102 stores energy to the received DC voltage. When the switch module 103 is turned off, the energy-storage transformer module 102 outputs the received DC voltage to the output filter module 105 after transforming voltage. The output filter module 105 filters the DC voltage which is transformed, and outputs the DC voltage to a loading after filtration. The pulse width modulation chip is used for providing a pulse signal to the switch module, to control a switch of the switch module.

On/Off of the switch module 103 is controlled by the pulse signal supplied from the pulse width modulation chip 104, the voltage outputted from the output filter module 105 is monitored by the voltage feedback module 106 during the process of voltage output, and when the output voltage is changed, a feedback signal is generated to the pulse width modulation chip 104, which adjusts the pulse signal in response to the feedback signal to control the switching time ratio of the switch module 103 to adjust the output voltage value to keep the output voltage stable.

Specifically, in the embodiment of the present invention, the rectifying filter module 101 comprises a rectifying bridge BD102, a first electrolytic capacitor CP4, and a first capacitor C3. A first terminal of the rectifying bridge BD102 is electrically connected with an anode of the first electrolytic capacitor CP4, the second terminal of the rectifying bridge BD102 is electrically connected with a neutral line of the AC voltage, the third terminal of the rectifying bridge BD102 is electrically connected with a live wire of the AC voltage, and the fourth terminal of the rectifying bridge BD102 is grounded. The anode of the first electrolytic capacitor CP4 is electrically connected to one terminal of the first capacitor C3 and the cathode of the first electrolytic capacitor CP4 is grounded.

The energy-storage transformer module 102 comprises a fourth resistor RM106, a second capacitor C15, a first diode DM104, and a transformer TM104. The switch module 103 comprises a MOS transistor Q1 and a fifth resistor RM107. One terminal of the fourth resistor RM106 is electrically connected to the terminal of the first capacitor C3 and the other terminal of the fourth resistor RM106 is electrically connected to a cathode of the first diode DM104. One terminal of the second capacitor C15 is electrically connected to the terminal of the fourth resistor RM106 and the other terminal of the second capacitor C15 is electrically connected to the cathode of the first diode DM104. The transformer TM104 comprises a primary coil L1, a first secondary coil L2, and a second secondary coil L3, one terminal of the primary coil L1 is electrically connected to the terminal of the second capacitor C15 and the other terminal of the primary coil L1 is electrically connected to an anode of the first diode DM104, the first and the second secondary coils L2, L3 are electrically connected to the output filter module 105. The anode of the first diode DM 104 is electrically connected to a drain electrode of the MOS transistor Q1. A gate electrode and a source electrode of the MOS transistor Q1 are electrically connected to the pulse width modulation chip 104. One terminal of the fifth resistor RM107 is electrically connected to the source electrode of the MOS transistor Q1 and the other terminal of the fifth resistor RM107 is grounded.

The output filter module 105 comprises a second diode DM105, a third diode DM106, a fourth diode DM107, a fifth diode DM108, a second electrolytic capacitor CP3, and a third electrolytic capacitor CP5. An anode of the second diode DM105 is electrically connected to one terminal of the first secondary coil L2 and a cathode of the second diode DM105 outputs the backlight driving voltage. An anode of the third diode DM106 is electrically connected to the anode of the second diode DM105, a cathode of the third diode DM106 is electrically connected to the cathode of the second diode DM105. An anode of the fourth diode DM107 is electrically connected to one terminal of the second secondary coil L3 and the cathode of the fourth diode DM107 is electrically connected to the other terminal of the first secondary coil L2 and outputs the motherboard driving voltage at the same time. An anode of the fifth diode DM108 is electrically connected to the anode of the fourth diode DM107 and a cathode of the fifth diode DM108 is electrically connected to the cathode of the fourth diode DM108. An anode of the second electrolytic capacitor CP3 is electrically connected to the cathode of the second diode DM105 and a cathode of the second electrolytic capacitor CP3 is grounded. An anode of the third electrolytic capacitor CP5 is electrically connected to the other terminal of the first secondary coil L2 and a cathode of the third electrolytic capacitor CP5 is electrically connected to the other terminal of the second secondary coil L3 and is grounded at the same time.

The feedback module 106 comprises a photo-coupler UM106, a third capacitor C16, a sixth resistor RM213, a seventh resistor RM214, an eighth resistance RM216, a ninth resistance RM217, a tenth resistance RM218, and a controllable precision regulator supply PQ4. An anode of a light-emitting diode of the photo-coupler UM106 is electrically connected to one terminal of the seventh resistor RM214, the cathode of the light-emitting diode of the photo-coupler UM106 is electrically connected to the other terminal of the seventh resistor RM214, an emit electrode of a phototransistor of the photo-coupler UM106 is electrically connected to one terminal of the third capacitor C16, the collect electrode of the phototransistor of the photo-coupler UM106 is electrically connected to the other terminal of the third capacitor C16. The terminal of the third capacitor C16 is grounded and the other terminal of the third capacitor C16 is electrically connected to the pulse width modulation chip 104. One terminal of the sixth resistor RM213 is electrically connected to the cathode of the second diode DM105 and the other terminal of the sixth resistor RM213 is electrically connected to the terminal of the seventh resistor RM214. The other terminal of the seventh resistor RM214 is electrically connected to the cathode of the controllable precision regulator supply PQ4. One terminal of the eighth resistor RM216 is electrically connected to the reference electrode of the controllable precision regulator supply PQ4 and the other terminal of the eighth resistor RM216 is electrically connected to the anode of the controllable precision regulator supply PQ4 and is grounded at the same time. One terminal of the ninth resistor RM217 is electrically connected to the cathode of the fourth diode DM107 and the other terminal of the ninth resistor RM217 is electrically connected to the terminal of the eighth resistor RM216. One terminal of the tenth resistor RM218 is electrically connected to the cathode of the second diode DM105 and the other terminal of the tenth resistor RM218 is electrically connected to the terminal of the eighth resistor RM216.

It can be understood that the main power supply 1 of the present invention is not limited to the above-described specific modules and circuits, and other power sources which can generate a stable backlight driving voltage and a motherboard driving voltage may be used as the main power source 1 of the present invention, which will not affect the realization of the present invention.

As mentioned above, the present invention provides a TV power supply, which comprises a main power supply and a voltage conversion circuit electrically connected to the main power supply. The main power supply comprises a first output terminal for outputting a backlight driving voltage and a second output terminal for outputting a motherboard driving voltage. The voltage conversion circuit is configured to convert the backlight driving voltage or the motherboard driving voltage to a standby voltage. The voltage conversion circuit comprises an input terminal electrically connected to the first output terminal or the second output terminal and a third output terminal for outputting the standby voltage. The TV power supply can convert the backlight driving voltage or the motherboard driving voltage into the standby voltage through the voltage conversion circuit, and simultaneously generates the motherboard driving voltage, the backlight driving voltage and the standby voltage through a power supply, effectively reducing the number of the flyback power supply and reducing the TV power supply costs, and improving the cost competitiveness of the TV.

One terminal of the first capacitor is electrically connected to the energy-storage transformer module and the other terminal of the first capacitor is grounded.

The feedback module is used for monitoring the output of the backlight driving voltage and the motherboard driving voltage, and generating a feedback signal to control the pulse width modulation chip for adjusting the pulse signal to ensure the stable output of the backlight driving voltage and motherboard driving voltage, when the backlight driving voltage and the motherboard driving voltage change.

As mentioned above, those of ordinary skill in the art, without departing from the spirit and scope of the present invention, can make various kinds of modifications and variations to the present invention. Therefore, all such modifications and variations are intended to be included in the protection scope of the appended claims of the present invention.

What is claimed is:

1. A TV power supply, comprising a main power supply and a voltage conversion circuit electrically connected to the main power supply;
   the main power supply comprising a first output terminal for outputting a backlight driving voltage and a second output terminal for outputting a motherboard driving voltage;
   the voltage conversion circuit being configured to convert the backlight driving voltage or a motherboard driving voltage to a standby voltage, the voltage conversion circuit comprising an input terminal electrically connected to the first output terminal or the second output terminal and a third output terminal for outputting the standby voltage;
   wherein the voltage conversion circuit comprises a first resistor, a second resistor, a third resistor, a first transistor, a second transistor, and a zener diode;
   one terminal of the first resistor is electrically connected to a first node and the other terminal of the first resistor is electrically connected to an emitting electrode of the second transistor;
   one terminal of the second resistor is electrically connected to the first node and the other terminal of the second resistor is electrically connected to one terminal of the third resistor;

the other terminal of the third resistor is electrically connected to a base electrode of the first transistor;

a collect electrode of the first transistor is electrically connected to the terminal of the third resistor, the emit electrode of the first transistor is electrically connected to a second node;

the base electrode of the second transistor is electrically connected to the terminal of the third resistor and the collect electrode of the second transistor is electrically connected to the second node;

a cathode of the zener diode is electrically connected to the base electrode of the first transistor and the anode of the zener diode is grounded;

the first node is the input terminal of the voltage conversion circuit, the second node is the third output terminal of the voltage conversion circuit;

the voltage difference between a stable voltage of the zener diode and the conduction voltage drop of the emitter junction of the first transistor is equal to the standby voltage.

2. The TV power supply according to claim 1, wherein the backlight driving voltage is 24V, the motherboard driving voltage is 12V, and the standby voltage is 5V.

3. The TV power supply according to claim 2, wherein the stabilize voltage of the zener diode is 5.7 V and the conduction voltage drop of the emitter junction of the first transistor is 0.7 V.

4. The TV power supply according to claim 1, wherein the first transistor is an NPN type transistor and the second transistor is a PNP type transistor.

5. The TV power supply according to claim 1, wherein the main power supply comprises a rectifying filter module, an energy-storage transformer module electrically connected with the rectifying filter module, a switch module electrically connected to the energy-storage transformer module, a pulse width modulation chip electrically connected to the switch module, an output filter module electrically connected with the energy-storage transformer module, and a feedback module electrically connected with both the output filter module and the pulse width modulation chip;

the rectifying filter module is used for accessing an AC voltage and converting the AC voltage into a DC voltage, and filtering the DC voltage to the energy-storage transformer module;

the energy-storage transformer module is used for storing energy under the control of the switch module or outputting the received DC voltage to the output filter module after transforming voltage;

the switch module is used for controlling the energy-storage transformer module to store energy or transforming voltage;

the pulse width modulation chip is used for providing a pulse signal to the switch module, to control a switch of the switch module;

the output filter module is used for filtering the DC voltage transformed by the energy-storage transformer module, and outputting the backlight driving voltage and the motherboard driving voltage;

the feedback module is used for monitoring the output of the backlight driving voltage and the motherboard driving voltage, and generating a feedback signal to control the pulse width modulation chip for adjusting the pulse signal to ensure the stable output of the backlight driving voltage and motherboard driving voltage, when the backlight driving voltage and the motherboard driving voltage change.

6. The TV power supply according to claim 5, wherein the rectifying filter module comprises a rectifying bridge, a first electrolytic capacitor, and a first capacitor;

a first terminal of the rectifying bridge is electrically connected with an anode of the first electrolytic capacitor, the second terminal of the rectifying bridge is electrically connected with a neutral line of the AC voltage, the third terminal of the rectifying bridge is electrically connected with a live wire of the AC voltage, and the fourth terminal of the rectifying bridge is grounded;

the anode of the first electrolytic capacitor is electrically connected to one terminal of the first capacitor and the cathode of the first electrolytic capacitor is grounded;

one terminal of the first capacitor is electrically connected to the energy-storage transformer module and the other terminal of the first capacitor is grounded.

7. The TV power supply according to claim 6, wherein the energy-storage transformer module comprises a fourth resistor, a second capacitor, a first diode, and a transformer; the switch module comprises a MOS transistor and a fifth resistor;

one terminal of the fourth resistor is electrically connected to the terminal of the first capacitor and the other terminal of the fourth resistor is electrically connected to a cathode of the first diode;

one terminal of the second capacitor is electrically connected to the terminal of the fourth resistor and the other terminal of the second capacitor is electrically connected to the cathode of the first diode;

the transformer comprises a primary coil, a first secondary coil, and a second secondary coil, one terminal of the primary coil is electrically connected to the terminal of the second capacitor and the other terminal of the primary coil is electrically connected to an anode of the first diode, the first and the second secondary coils are electrically connected to the output filter module;

the anode of the first diode is electrically connected to a drain electrode of the MOS transistor;

a gate electrode and a source electrode of the MOS transistor are electrically connected to the pulse width modulation chip;

one terminal of the fifth resistor is electrically connected to the source electrode of the MOS transistor and the other terminal of the fifth resistor is grounded.

8. The TV power supply according to claim 7, the output filter module comprises a second diode, a third diode, a fourth diode, a fifth diode, a second electrolytic capacitor, and a third electrolytic capacitor;

an anode of the second diode is electrically connected to one terminal of the first secondary coil and a cathode of the second diode outputs the backlight driving voltage;

an anode of the third diode is electrically connected to the anode of the second diode and a cathode of the third diode is electrically connected to the cathode of the second diode;

an anode of the fourth diode is electrically connected to one terminal of the second secondary coil, and the cathode of the fourth diode is electrically connected to the other terminal of the first secondary coil and outputs the motherboard driving voltage at the same time;

an anode of the fifth diode is electrically connected to the anode of the fourth diode and a cathode of the fifth diode is electrically connected to the cathode of the fourth diode;

an anode of the second electrolytic capacitor is electrically connected to the cathode of the second diode and a cathode of the second electrolytic capacitor is grounded; and an anode of the third electrolytic capacitor is electrically connected to the other terminal of the first secondary coil and a cathode of the third electrolytic capacitor is electrically connected to the other terminal of the second secondary coil and is grounded at the same time.

9. The TV power supply according to claim 8, wherein the feedback module comprises a photo-coupler, a third capacitor, a sixth resistor, a seventh resistor, an eighth resistance, a ninth resistance, a tenth resistance, and a controllable precision regulator supply;

an anode of a light-emitting diode of the photo-coupler is electrically connected to one terminal of the seventh resistor, the cathode of the light-emitting diode of the photo-coupler is electrically connected to the other terminal of the seventh resistor, an emit electrode of a phototransistor of the photo-coupler is electrically connected to one terminal of the third capacitor, the collect electrode of the phototransistor of the photo-coupler is electrically connected to the other terminal of the third capacitor;

the terminal of the third capacitor is grounded and the other terminal of the third capacitor is electrically connected to the pulse width modulation chip;

one terminal of the sixth resistor is electrically connected to the cathode of the second diode and the other terminal of the sixth resistor is electrically connected to the terminal of the seventh resistor;

the other terminal of the seventh resistor is electrically connected to the cathode of the controllable precision regulator supply;

one terminal of the eighth resistor is electrically connected to the reference electrode of the controllable precision regulator supply and the other terminal of the eighth resistor is electrically connected to the anode of the controllable precision regulator supply and is grounded at the same time;

one terminal of the ninth resistor is electrically connected to the cathode of the fourth diode and the other terminal of the ninth resistor is electrically connected to the terminal of the eighth resistor;

one terminal of the tenth resistor is electrically connected to the cathode of the second diode and the other terminal of the tenth resistor is electrically connected to the terminal of the eighth resistor.

10. A TV power supply, comprising a main power supply and a voltage conversion circuit electrically connected to the main power supply;

the main power supply comprising a first output terminal for outputting a backlight driving voltage and a second output terminal for outputting a motherboard driving voltage;

the voltage conversion circuit being configured to convert the backlight driving voltage or a motherboard driving voltage to a standby voltage, the voltage conversion circuit comprising an input terminal electrically connected to the first output terminal or the second output terminal and a third output terminal for outputting the standby voltage;

wherein the voltage conversion circuit comprises a first resistor, a second resistor, a third resistor, a first transistor, a second transistor, and a zener diode;

one terminal of the first resistor is electrically connected to a first node and the other terminal of the first resistor is electrically connected to an emitting electrode of the second transistor;

one terminal of the second resistor is electrically connected to the first node and the other terminal of the second resistor is electrically connected to one terminal of the third resistor;

the other terminal of the third resistor is electrically connected to a base electrode of the first transistor;

a collect electrode of the first transistor is electrically connected to the terminal of the third resistor, the emit electrode of the first transistor is electrically connected to a second node;

the base electrode of the second transistor is electrically connected to the terminal of the third resistor and the collect electrode of the second transistor is electrically connected to the second node;

a cathode of the zener diode is electrically connected to the base electrode of the first transistor and the anode of the zener diode is grounded;

the first node is the input terminal of the voltage conversion circuit, the second node is the third output terminal of the voltage conversion circuit;

the voltage difference between a stable voltage of the zener diode and the conduction voltage drop of the emitter junction of the first transistor is equal to the standby voltage;

wherein the main power supply comprises a rectifying filter module, an energy-storage transformer module electrically connected with the rectifying filter module, a switch module electrically connected to the energy-storage transformer module, a pulse width modulation chip electrically connected to the switch module, an output filter module electrically connected with the energy-storage transformer module, and a feedback module electrically connected with both the output filter module and the pulse width modulation chip;

the rectifying filter module is used for accessing an AC voltage and converting the AC voltage into a DC voltage, and filtering the DC voltage to the energy-storage transformer module;

the energy-storage transformer module is used for storing energy under the control of the switch module or outputting the received DC voltage to the output filter module after transforming voltage;

the switch module is used for controlling the energy-storage transformer module to store energy or transforming voltage;

the pulse width modulation chip is used for providing a pulse signal to the switch module, to control a switch of the switch module;

the output filter module is used for filtering the DC voltage transformed by the energy-storage transformer module, and outputting the backlight driving voltage and the motherboard driving voltage;

the feedback module is used for monitoring the output of the backlight driving voltage and the motherboard driving voltage, and generating a feedback signal to control the pulse width modulation chip for adjusting the pulse signal to ensure the stable output of the backlight driving voltage and motherboard driving voltage, when the backlight driving voltage and the motherboard driving voltage change.

11. The TV power supply according to claim 10, wherein the backlight driving voltage is 24V, the motherboard driving voltage is 12V, and the standby voltage is 5V.

12. The TV power supply according to claim 11, wherein the stabilize voltage of the zener diode is 5.7 V and the conduction voltage drop of the emitter junction of the first transistor is 0.7 V.

13. The TV power supply according to claim 10, wherein the first transistor is an NPN type transistor, and the second transistor is a PNP type transistor.

14. The TV power supply according to claim 10, wherein the rectifying filter module comprises a rectifying bridge, a first electrolytic capacitor, and a first capacitor;
   a first terminal of the rectifying bridge is electrically connected with an anode of the first electrolytic capacitor, the second terminal of the rectifying bridge is electrically connected with a neutral line of the AC voltage, the third terminal of the rectifying bridge is electrically connected with a live wire of the AC voltage, and the fourth terminal of the rectifying bridge is grounded;
   the anode of the first electrolytic capacitor is electrically connected to one terminal of the first capacitor and the cathode of the first electrolytic capacitor is grounded;
   one terminal of the first capacitor is electrically connected to the energy-storage transformer module and the other terminal of the first capacitor is grounded.

15. The TV power supply according to claim 14, wherein the energy-storage transformer module comprises a fourth resistor, a second capacitor, a first diode, and a transformer; the switch module comprises a MOS transistor and a fifth resistor;
   one terminal of the fourth resistor is electrically connected to the terminal of the first capacitor and the other terminal of the fourth resistor is electrically connected to a cathode of the first diode;
   one terminal of the second capacitor is electrically connected to the terminal of the fourth resistor and the other terminal of the second capacitor is electrically connected to the cathode of the first diode;
   the transformer comprises a primary coil, a first secondary coil, and a second secondary coil, one terminal of the primary coil is electrically connected to the terminal of the second capacitor and the other terminal of the primary coil is electrically connected to an anode of the first diode, the first and the second secondary coils are electrically connected to the output filter module;
   the anode of the first diode is electrically connected to a drain electrode of the MOS transistor;
   a gate electrode and a source electrode of the MOS transistor are electrically connected to the pulse width modulation chip;
   one terminal of the fifth resistor is electrically connected to the source electrode of the MOS transistor and the other terminal of the fifth resistor is grounded.

16. The TV power supply according to claim 15, the output filter module comprises a second diode, a third diode, a fourth diode, a fifth diode, a second electrolytic capacitor, and a third electrolytic capacitor;
   an anode of the second diode is electrically connected to one terminal of the first secondary coil and a cathode of the second diode outputs the backlight driving voltage;
   an anode of the third diode is electrically connected to the anode of the second diode, a cathode of the third diode is electrically connected to the cathode of the second diode;
   an anode of the fourth diode is electrically connected to one terminal of the second secondary coil and the cathode of the fourth diode is electrically connected to the other terminal of the first secondary coil and outputs the motherboard driving voltage at the same time;
   an anode of the fifth diode is electrically connected to the anode of the fourth diode and a cathode of the fifth diode is electrically connected to the cathode of the fourth diode;
   an anode of the second electrolytic capacitor is electrically connected to the cathode of the second diode and a cathode of the second electrolytic capacitor is grounded; and
   an anode of the third electrolytic capacitor is electrically connected to the other terminal of the first secondary coil and a cathode of the third electrolytic capacitor is electrically connected to the other terminal of the second secondary coil and is grounded at the same time.

17. The TV power supply according to claim 16, wherein the feedback module comprises a photo-coupler, a third capacitor, a sixth resistor, a seventh resistor, an eighth resistance, a ninth resistance, a tenth resistance, and a controllable precision regulator supply;
   an anode of a light-emitting diode of the photo-coupler is electrically connected to one terminal of the seventh resistor, the cathode of the light-emitting diode of the photo-coupler is electrically connected to the other terminal of the seventh resistor, an emit electrode of a phototransistor of the photo-coupler is electrically connected to one terminal of the third capacitor, the collect electrode of the phototransistor of the photo-coupler is electrically connected to the other terminal of the third capacitor;
   the terminal of the third capacitor is grounded and the other terminal of the third capacitor is electrically connected to the pulse width modulation chip;
   one terminal of the sixth resistor is electrically connected to the cathode of the second diode and the other terminal of the sixth resistor is electrically connected to the terminal of the seventh resistor;
   the other terminal of the seventh resistor is electrically connected to the cathode of the controllable precision regulator supply;
   one terminal of the eighth resistor is electrically connected to the reference electrode of the controllable precision regulator supply and the other terminal of the eighth resistor is electrically connected to the anode of the controllable precision regulator supply and is grounded at the same time;
   one terminal of the ninth resistor is electrically connected to the cathode of the fourth diode and the other terminal of the ninth resistor is electrically connected to the terminal of the eighth resistor;
   one terminal of the tenth resistor is electrically connected to the cathode of the second diode and the other terminal of the tenth resistor is electrically connected to the terminal of the eighth resistor.

* * * * *